(12) United States Patent
Kase

(10) Patent No.: US 10,768,514 B2
(45) Date of Patent: Sep. 8, 2020

(54) OPERATING DEVICE FOR ROTATING ROTATION BODY BY LEVER OPERATION AND PROJECTION APPARATUS INCLUDING OPERATING DEVICE

(71) Applicant: CASIO COMPUTER CO., LTD., Tokyo (JP)

(72) Inventor: Toshifumi Kase, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/249,585

(22) Filed: Jan. 16, 2019

(65) Prior Publication Data

US 2019/0219906 A1   Jul. 18, 2019

(30) Foreign Application Priority Data

Jan. 17, 2018   (JP) .................................. 2018-005246

(51) Int. Cl.
 *G03B 21/14* (2006.01)
 *G03B 3/02* (2006.01)
(52) U.S. Cl.
 CPC ............. *G03B 21/145* (2013.01); *G03B 3/02* (2013.01)
(58) Field of Classification Search
 CPC ................................ G03B 21/145; G03B 3/02
 USPC ........................................................ 353/85
 See application file for complete search history.

(56) References Cited

U.S. PATENT DOCUMENTS

| 2008/0218037 A1 | 9/2008 | Adachi et al. |
| 2008/0218705 A1 | 9/2008 | Adachi et al. |
| 2008/0218706 A1 | 9/2008 | Adachi et al. |
| 2008/0218707 A1 | 9/2008 | Adachi et al. |
| 2008/0231813 A1* | 9/2008 | Kawakami ............. G02B 13/16 353/70 |
| 2012/0281188 A1 | 11/2012 | Adachi et al. |
| 2015/0338725 A1 | 11/2015 | Kase |

FOREIGN PATENT DOCUMENTS

| JP | 2008-250280 A | 10/2008 |
| JP | 2011-002602 A | 1/2011 |
| JP | 2015225203 | * 5/2014 ............. G03B 21/14 |
| JP | 2015-222301 A | 12/2015 |
| JP | 2015-225203 A | 12/2015 |

OTHER PUBLICATIONS

MachineTranslationofJP2015225203 (Year: 2019).*

* cited by examiner

*Primary Examiner* — Jerry L Brooks
(74) *Attorney, Agent, or Firm* — Fitch, Even, Tabin & Flannery LLP

(57) ABSTRACT

An operating device rotates a cylindrical rotation body by lever operation to adjust a rotation angle. The operating device includes a lever, the rotation body and an arm. The lever is linearly movable along a direction orthogonal to a rotation axis of the rotation body. The rotation body is rotated by lever operation. The arm is fixed to the rotation body and transmits a movement of the lever as a rotational force to the rotation body. The arm has a shape extending from the rotation body toward the lever in a state where a position of the lever is at the farthest position within a movable range from a reference line passing through a rotation center of the rotation body and orthogonal to a direction which is orthogonal to the rotation axis of the rotation body.

20 Claims, 10 Drawing Sheets

OPERATING DEVICE FOR ROTATING ROTATION BODY BY LEVER OPERATION AND PROJECTION APPARATUS INCLUDING OPERATING DEVICE

CROSS-REFERENCE TO RELATED APPLICATION

This application is based upon and claims the benefit of priority from Japanese Patent Application No. 2018-005246, filed on Jan. 17, 2018, the entire contents of which are incorporated herein by reference.

BACKGROUND OF THE INVENTION

Field of the Invention

The present invention relates to an operating device for rotating a rotation body by lever operation and a projection apparatus including the operating device.

Description of the Related Art

There has been an image projection apparatus including a light source device, a display element irradiated with light emitted from the light source device to form image light, a projection optical system projecting the image light formed by the display element onto a screen, and a projector control unit controlling the display element and the light source device, the light source device includes a first light source, a second light source, a first heat sink for the first light source disposed to a side of the first light source, a second heat sink for the second light source which is disposed to a side of the second light source, and a first cooling fan disposed between the first heat sink and the second heat sink such that a blowing direction is substantially parallel to a direction in which the first heat sink and the second heat sink are aligned (for example, see JP-A-2015-222301).

Such a projection apparatus also includes an adjustment lever (simply referred to as a lever) for manually adjusting a focus.

Specifically, the projection optical system includes a fixed cylinder and a movable cylinder incorporating a fixed lens and a movable lens, linear motion of the lever is transmitted as a rotational force for rotating the movable cylinder, and the movable lens is moved in an optical axis direction by the rotation of the movable cylinder, so that the focus can be adjusted.

For example, as shown in FIG. 10, the linear motion of the lever is used as rotational motion.

As shown in FIG. 10, a movable cylinder CT2 is rotatably provided on an outer periphery of a fixed cylinder CT1 around a rotation center RC, and an arm CA of which a tip end side is slidably inserted into an adjustment lever CL is attached to a part of an outer periphery of the movable cylinder CT2.

With such a configuration, when the adjustment lever CL is linearly moved in a movement range MR in an upper-lower direction, the linear motion is transmitted as a rotational force to the movable cylinder CT2 via the arm CA.

Here, as can be seen from FIG. 10, a range in which the adjustment lever CL is movable is as follows. First, as seen from an upper side, the adjustment lever CL is moved to a position where a tip end of the arm CA does not come off the adjustment lever CL when moving upward.

Similarly, as seen from a lower side, the adjustment lever CL is moved to a position where the tip end of the arm CA does not come off the adjustment lever CL when moving downward.

Therefore, when a straight line (reference line) orthogonal to a direction of the linear motion (a direction along the movement range MR) of the adjustment lever CL is drawn through the rotation center RC of the movable cylinder CT2, it is said that setting the movement range such that an intermediate point MP of the movement range MR of the adjustment lever CL is located at a position on the straight line (reference line) is preferable for obtaining the necessary rotation of the movable cylinder CT2.

However, depending on the design of the device, it is also conceivable that a component is disposed above the reference line, and the adjustment lever CL can be moved only in a range below the reference line.

Meanwhile, it is also conceivable that the component is disposed below the reference line, and the adjustment lever CL can be moved only in a range above the reference line.

In such a case, there is a problem that rotating the movable cylinder CT2 by a rotation angle required for the movable cylinder CT2 is difficult to be designed.

Such a problem is not limited to the projection apparatus, and is common in the case where the linear motion of the lever is transmitted as a rotational force to the rotation body by the arm slidably inserted into the lever.

The present invention has been made in view of the above circumstances, and an object thereof is to provide an operating device which transmits linear motion of a lever as a rotational force to a rotation body by an arm slidable on the lever and which is capable of ensuring as large a rotation range of the rotation body as possible in the movement of the lever even when the movable range of linear motion of the lever is biased toward one side of the rotation body, and to provide a projection apparatus which includes the operating device.

SUMMARY OF THE INVENTION

An operating device rotates a cylindrical rotation body by lever operation to adjust a rotation angle. The operating device includes a lever, the rotation body and an arm. The lever is linearly movable along a direction orthogonal to a rotation axis of the rotation body. The rotation body is rotated by lever operation. The arm is fixed to the rotation body and transmits a movement of the lever as a rotational force to the rotation body. The arm has a shape extending from the rotation body toward the lever in a state where a position of the lever is at the farthest position within a movable range from a reference line passing through a rotation center of the rotation body and orthogonal to a direction which is orthogonal to the rotation axis of the rotation body.

A projection apparatus includes the operating device, a case, a light source device, a display element, a projection optical system and a control unit. The light source device is disposed in the case. The display element is disposed in the case and irradiated with light emitted from the light source device to form image light. The projection optical system is disposed in the case and projects the image light formed by the display element onto a screen. The control unit is disposed in the case and controls the display element and the light source device. A lever guide portion is formed in the case along a first direction, and the lever is movable in the first direction along the lever guide portion. The operating device is disposed in the projection optical system.

DETAILED DESCRIPTION OF THE PREFERRED EMBODIMENT

Figure 1:
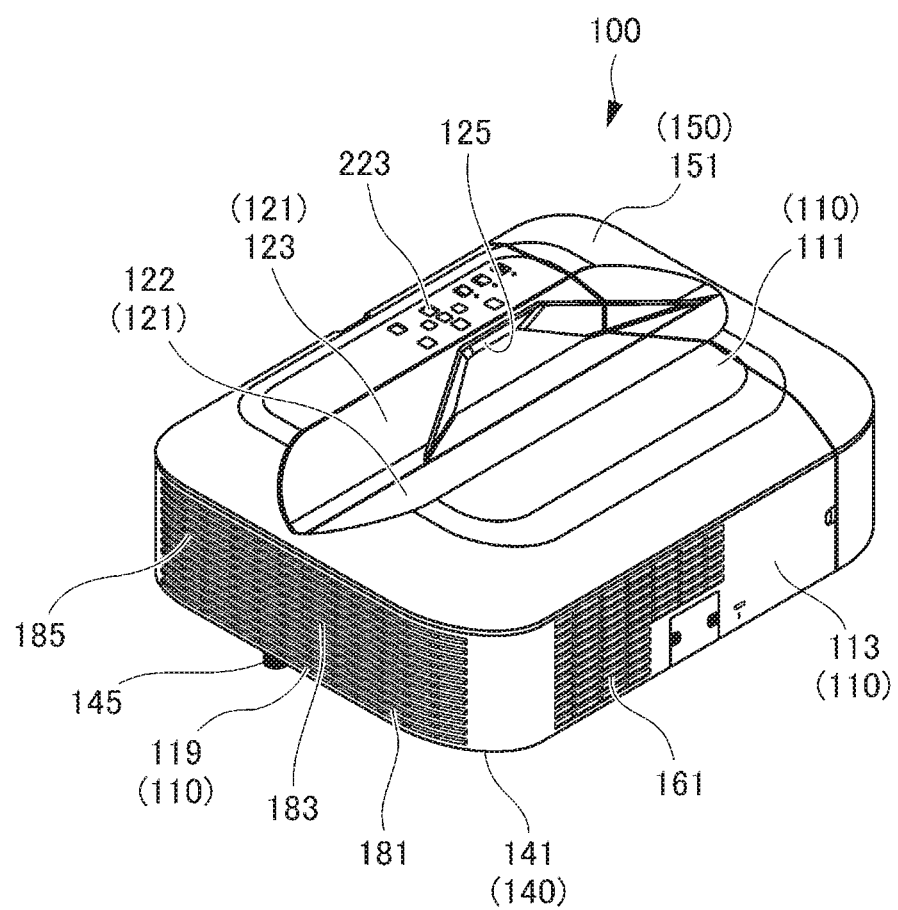
FIG. 1 is an external perspective view showing an example of a projector according to an embodiment of the present invention.

Hereinafter, a mode (hereinafter, referred to as "embodiment") for implementing the present invention will be described in detail with reference to the accompanying drawings.

Incidentally, the same elements are denoted by the same numbers or reference numerals throughout the description of the embodiment.

Further, the description below will be made based on a projection apparatus which is a is representative example of a device including an operating device which converts linear motion of a lever to rotational motion, but the operating device described below may be applied to other devices.

External Configuration of Projection Apparatus

FIG. 1 is an external perspective view of a projector 100 as the projection apparatus.

In the present embodiment, unless otherwise specified, left and right of the projector 100 indicate a left-right direction with respect to a projection direction, and front and rear indicate a front-rear direction of the projection direction the projector 100, and a lower right direction in FIG. 1 is regarded as front.

As shown in FIG. 1, the projection apparatus is the projector 100 having a substantially rectangular parallelepiped shape, and an upper case 110 covers various devices and circuit boards fixed to an upper surface of a bottom plate 141 on a lower case 140.

A front surface side air intake hole 161 is formed in a front plate 113 of the upper case 110 which is a housing of the projector 100, and a front air exhaust hole 181, a central air exhaust hole 183, and a rear air exhaust hole 185 are formed in the front, middle, and rear portions of a right side plate 119, respectively.

In the lower case 140, legs 145 are attached to three places of the bottom plate 141, and each leg 145 includes a screw portion capable of adjusting the height.

Figure 2:
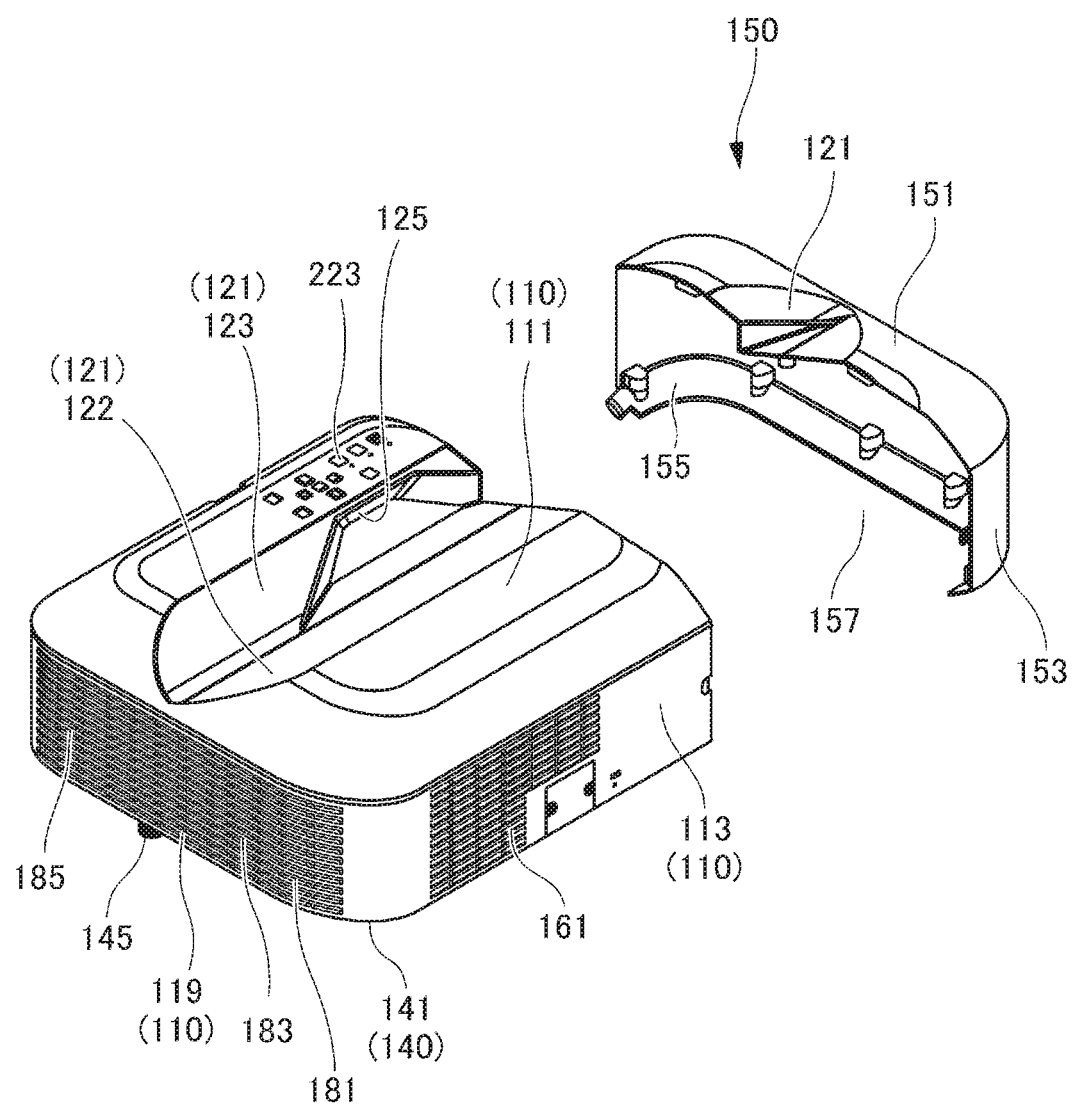
FIG. 2 is an external perspective view showing a state where a connector cover of the projector according to the embodiment of the present invention is removed.

As shown in FIG. 2, the projector housing is formed by a housing body including the upper case 110 and the lower case 140, and a connector cover 150 which is attachable to and detachable from the housing body and which covers a eft side plate 117 (see FIG. 3) of the housing body.

A key/indicator unit 223 is provided on an upper plate 111 of the upper case 110.

The key/indicator unit 223 includes a power source switch key, a projection switch key turning a projection on and off, a power indicator making a notification of the turning-on/turning-off of the power source, a key or an indicator such as an overheat indicator which makes a notification when a light source unit 250 (see FIG. 4), a display element 420 (see FIG. 7), or a control circuit is overheat.

A V-shaped cut groove 121 formed by a from inclined portion 122 and a rear inclined to portion 123 is formed on the upper plate 111 of the upper case 110 so as to extend in a left-right direction.

A projection port 125 is formed in the rear inclined portion 123, and image light can be emitted obliquely forward from the projection port 125.

The cut groove 121 is formed from the upper plate 111 of the upper case 110 to an upper surface portion 151 of the connector cover 150.

As shown in FIG. 2, the connector cover 150 includes the upper surface portion 151, a side surface portion 153 of which both front and rear ends are curved in an arc shape, and a lower surface portion 155 along a lower end of the side surface portion 153.

An inner side of the lower surface portion 155 serves as an opening portion 157, and cords of various connectors connected to an input/output connector unit 211 (see FIG. 3) on the left side plate 117 (see FIG. 3) of the upper case 110 can be pulled out.

Figure 3:
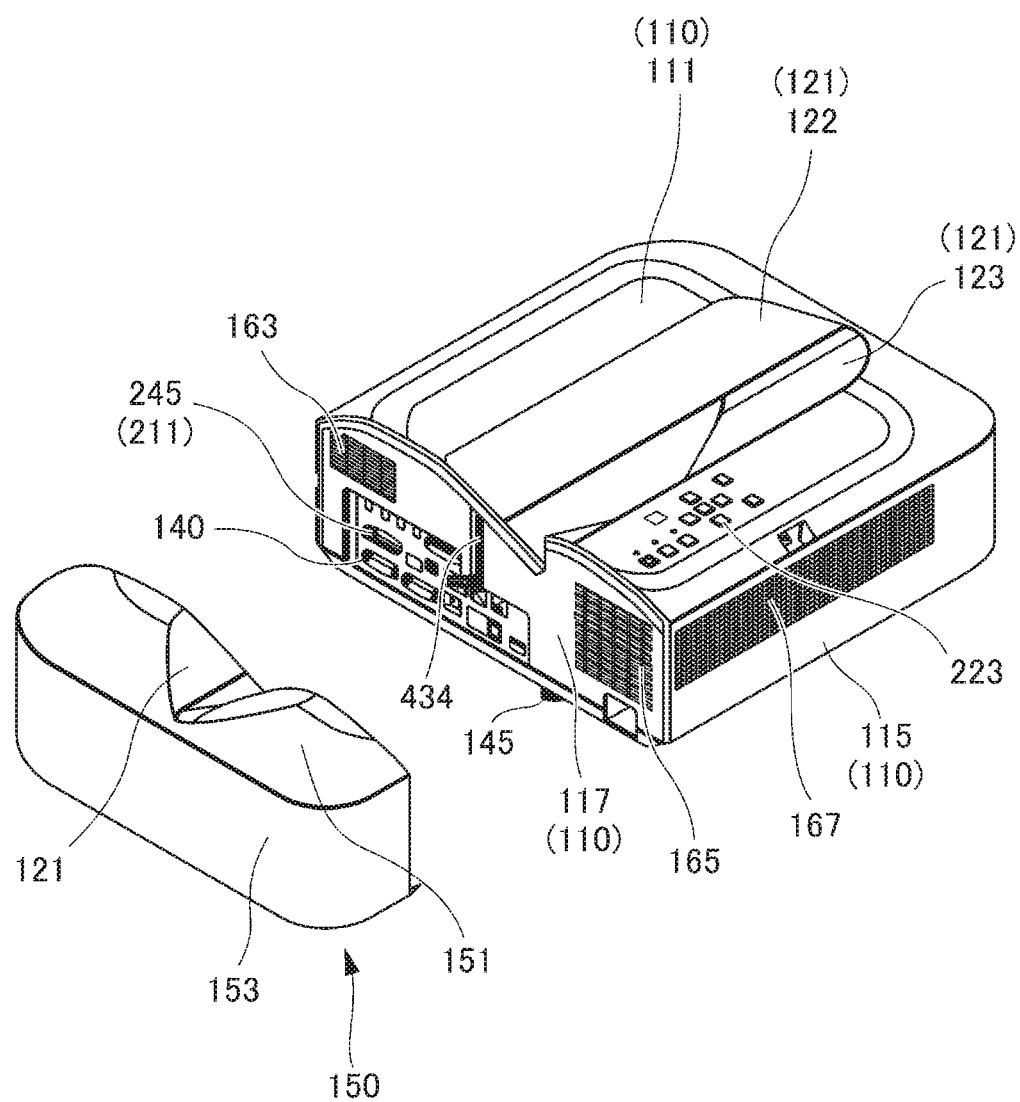
FIG. 3 is a rear external perspective view showing a state where the connector cover of the projector according to the embodiment of the present invention is removed.

As shown in FIG. 3, the input/output connector unit 211 is provided on the left side plate 117 of the upper case 110, and various terminals (groups) such as an SB (serial bus) terminal, a D-SUB terminal for video signal input to which an analog RGB video signal is input, an S terminal, an RCA terminal, a sound output terminal, a power adapter, and a plug are provided on a connector board 245.

A side surface front portion air intake hole 163 is provided at a front portion of the left side plate 117 and above the input/output connector unit 211, and a side surface rear portion air intake hole 165 is provided at a rear portion of the left side plate 117.

Figure 4:
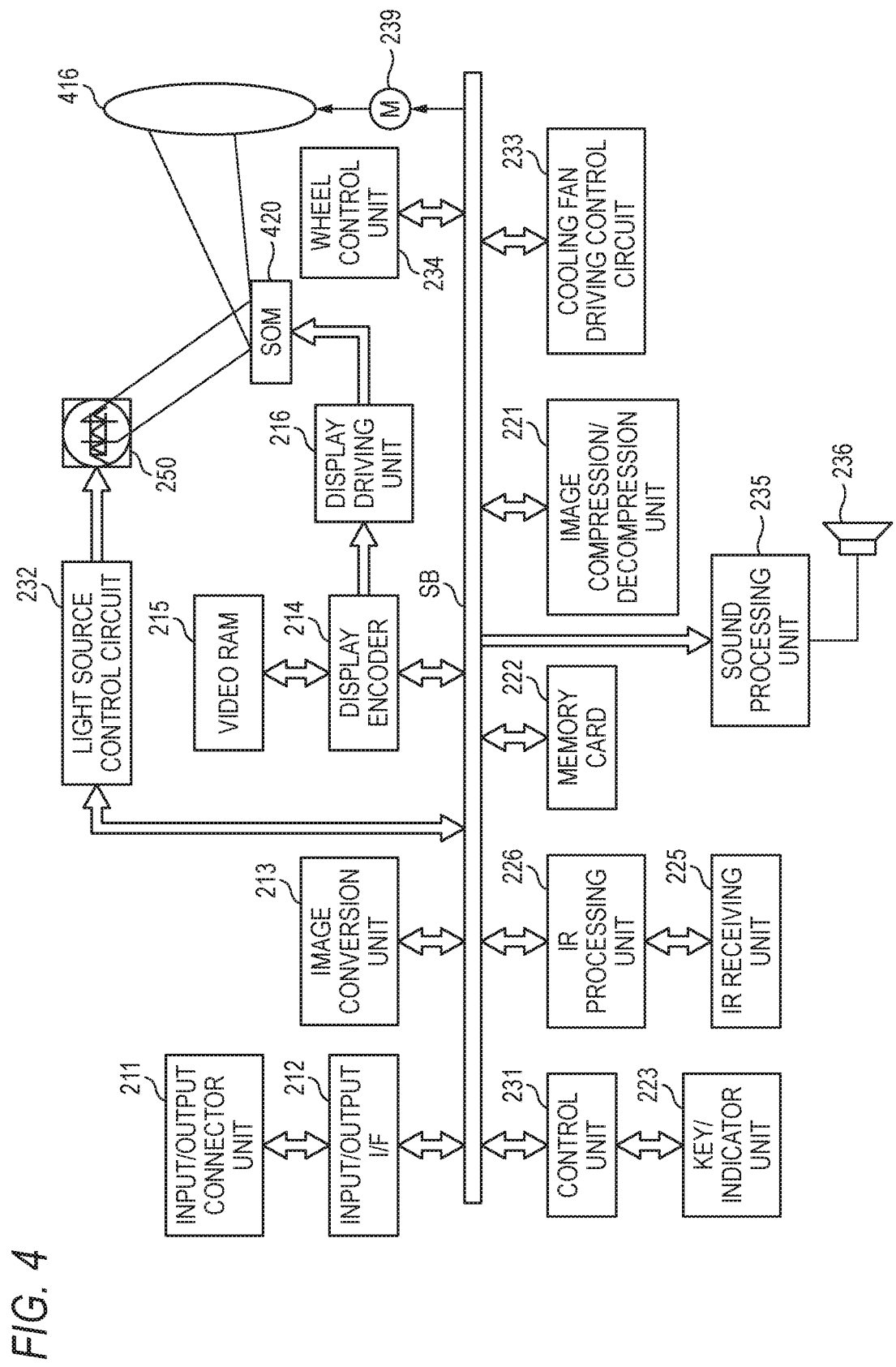
FIG. 4 is a block diagram showing a functional configuration of the projector according to the embodiment of the present invention.

A rear surface side air intake hole 167 is provided at a rear plate 115 of the upper case 110, and a portion in the vicinity of a right end in the rear surface side air intake hole 167 also serves as a hole for emitting sound from a speaker 236 (see FIG. 4).

Functional Configuration of Projection Apparatus

Next, a projector control unit of the projector 100 which is the projection apparatus will be described with reference to a block diagram of FIG. 4.

The projector control unit includes a control unit 231, an input/output interface 212, an image conversion unit 213, a display encoder 214, a display driving unit 216, or the like.

Through the projector control unit, image signals of various standards input from the input/output connector unit 211 are standardized to image signals of a predetermined format suitable for display by the image conversion unit 213 via, the input/output interface 212 and the system bus (SB) and then output to the display encoder 214.

The control unit 231 controls the operation of each circuit in the projector 100, and includes a CPU as an arithmetic device, a ROM in which operation programs such as various settings are fixedly stored, a RAM used as a work memory, or the like.

The display encoder 214 expands and stores the input image signal in a video RAM 215, generates a video signal from the stored content of the video RAM 215, and outputs the video signal to the display driving unit 216.

The display driving unit 216 functions as a display element control unit and drives the display element 420 which is a spatial light modulation element (SOM) at an appropriate frame rate according to the image signal output from the display encoder 214.

The projector 100 includes the light source unit 250. The light source unit 250 includes an excitation light irradiation device 310 (see FIG. 7) including an excitation light source or the like; a light source device 330 (see FIG. 7) including a phosphor light emitting device 331 (see FIG. 7), a red light source device 350 (see FIG. 7), and a light guide optical system 370 (see FIG. 7); a light source side optical device 380 (see FIG. 7) including a light tunnel 383 (see FIG. 7), or the like.

Figure 7:
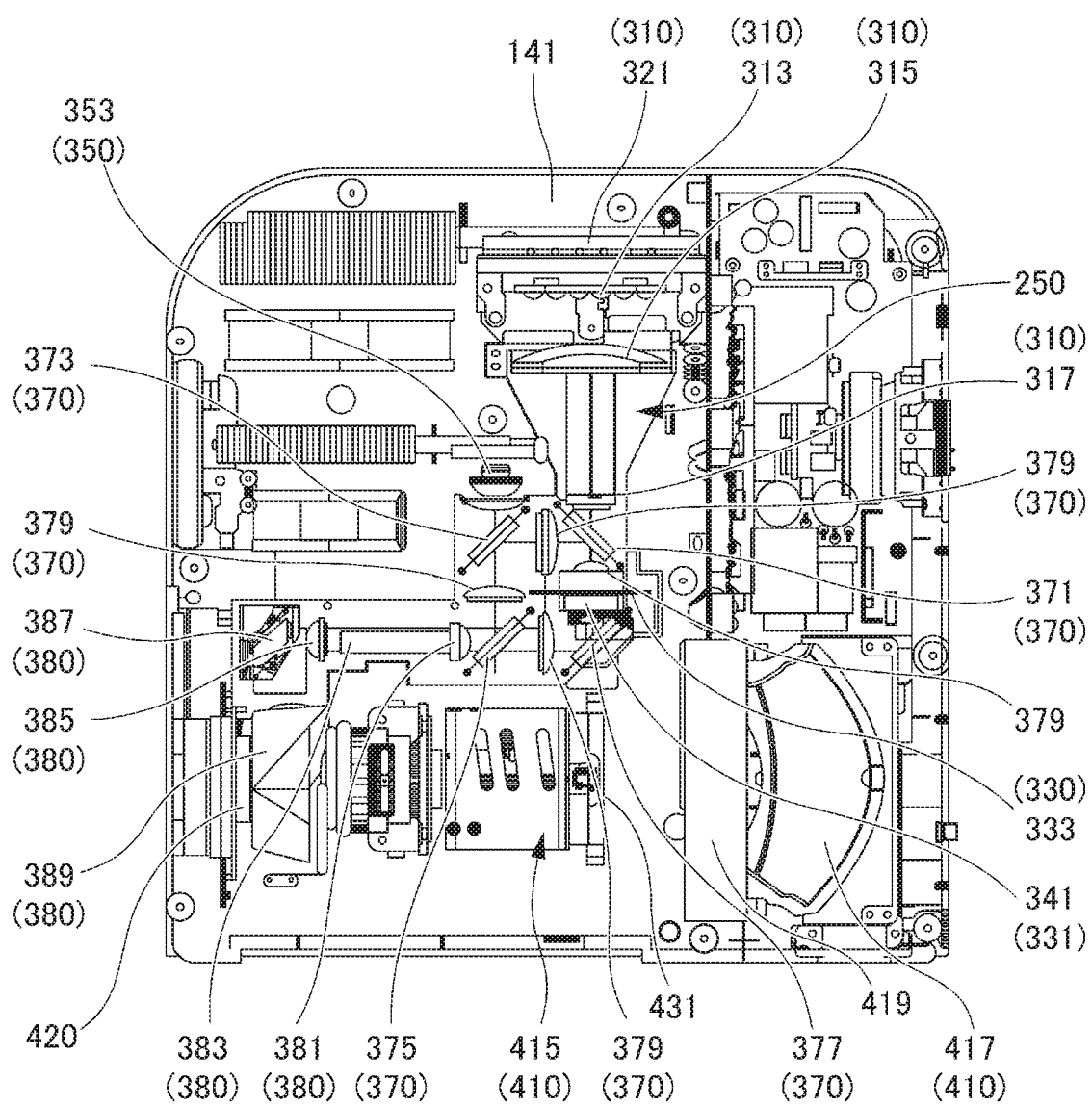
FIG. 7 is a schematic diagram of the internal structure centered on an optical system of the projector according to the embodiment of the present invention.

By irradiating the light beam emitted from the light source device 330 of the light source unit 250 to the display element 420 (see FIG. 7) via the light source side optical device 380 of the light source unit 250, the projector 100 forms an optical image with reflected light of the display element 420, and projects and displays an image on a screen such as a wall surface via a projection optical system unit 410 (see FIG. 7).

As shown in FIG. 4, a movable lens group 416 of the projection optical system unit 410 is driven by a lens motor 239 to perform zoom adjustment and focus adjustment (the adjustment can also be performed manually).

Further, an image compression/decompression unit 221 reads image data recorded in a memory card 222 at the time of reproduction, extends image data constituting a series of moving images in units of one frame, outputs the image data to the display encoder 214 via the image conversion unit 213, and performs processing which enables display of the moving images or the like based on the image data stored in the memory card 222.

An operation signal from the key/indicator unit 223 provided on the upper case 110 of the housing is directly sent to the control unit 231.

A key operation signal from a remote controller is received by an IR receiving unit 225, and a code signal demodulated by an IR processing unit 226 is output to the control unit 231.

A sound processing unit 235 is connected to the control unit 231 via the system bus (SB).

The sound processing unit 235 includes a sound source circuit such as a PCM sound source, converts sound data into analog data in a projection mode and a reproduction mode, and drives the speaker 236 to emit amplified sound.

The control unit 231 controls alight source control circuit 232 as a light source control unit.

The light source control circuit 232 individually controls the emission of the excitation light irradiation device 310 and the red light source device 350 of the light source unit 250 and controls the rotation of a phosphor wheel 333 (see FIG. 7) of the phosphor light emitting device 331 via a wheel control unit 234 such that light source light of a predetermined wavelength band required during image generation is emitted from the light source device 330 of the light source unit 250.

Further, the control unit 231 causes a cooling fan driving control circuit 233 to perform temperature detection through a plurality of temperature sensors provided at the light source unit 250 or the like, and controls the rotational speed of a cooling fan based on a result of the temperature detection.

Further, the control unit 231 causes the cooling fan driving control circuit 233 to make the cooling fan continue to rotate even after the power supply of a projector body is turned off by a timer or the like, or controls the power supply of the projector body to be turned off depending on the result of the temperature detection by the temperature sensors.

Internal Structure of Projection Apparatus

Next, an internal structure of the projector 100 which is the projection apparatus will be described.

Figure 5:
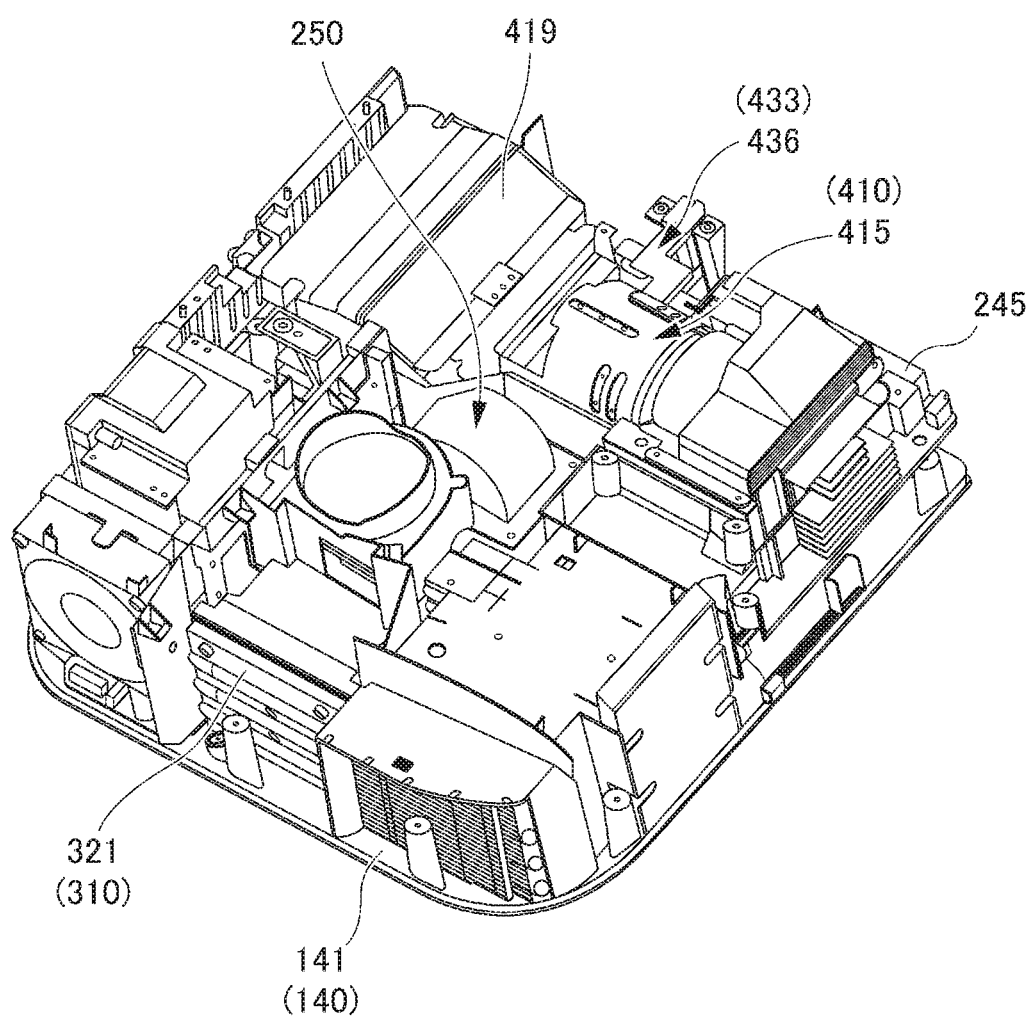
FIG. 5 is a perspective view showing an example of an internal structure where an upper case of the projector according to the embodiment of the present invention is removed.
Figure 6:
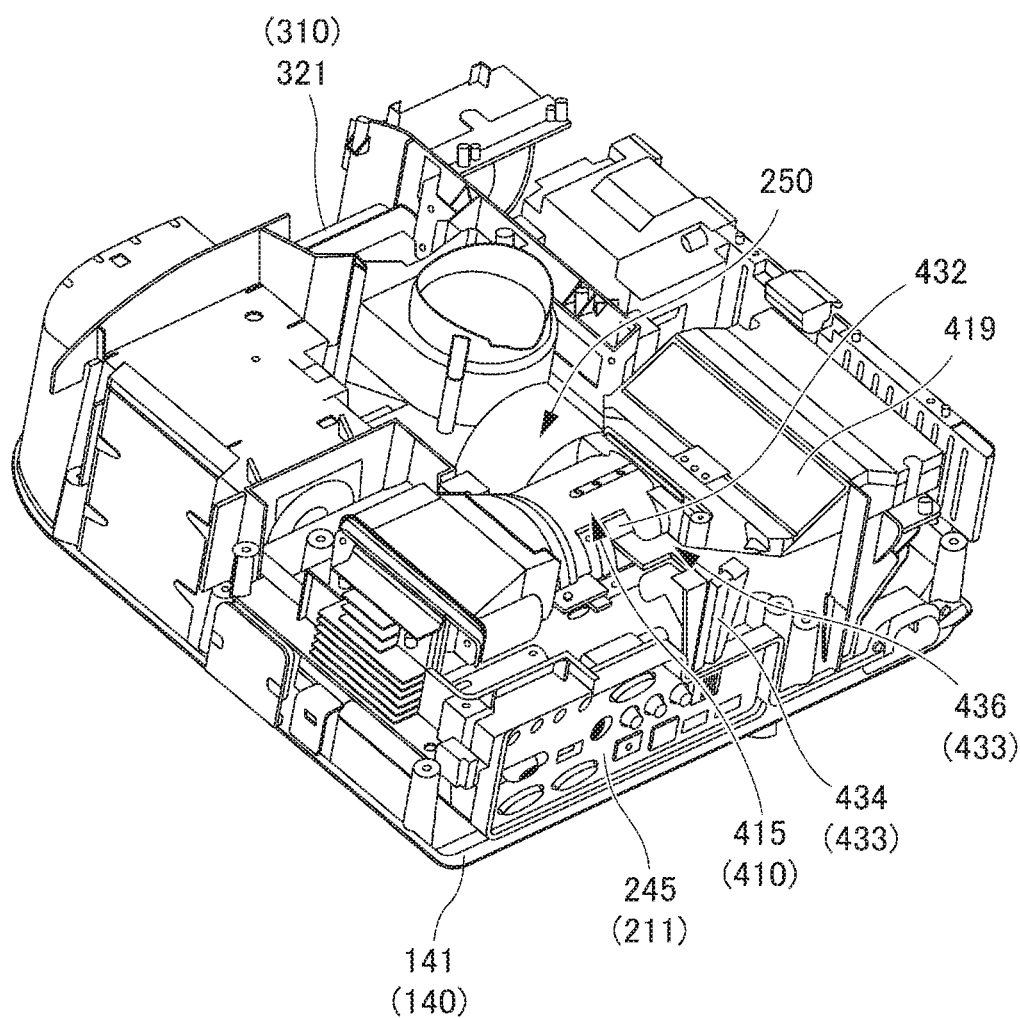
FIG. 6 is a perspective view showing an example of the internal structure where the upper case of the projector according to the embodiment of the present invention is removed, viewed from another angle.

FIGS. 5 and 6 are perspective views showing the internal structure of the projector 100, and FIG. 7 is a schematic diagram of an internal structure centered on an optical system.

As shown in FIGS. 5 to 7, the light source unit 250, the display element 420, the projection optical system unit 410, or the like are disposed inside the projector 100.

The light source unit 250 includes the excitation light irradiation device 310, the light source device 330, and the light source side optical device 380.

The excitation light irradiation device 310 includes excitation light sources, a collimator lens 313, a condenser lens 315, and a diffusion plate 317.

32 blue laser emitters which are semiconductor light emitting elements are disposed as excitation light sources in an element holder 321, and laser light from the respective blue laser emitters is converted into substantially parallel light beams by the collimator lens 313 and enters the condenser lens 315.

The element holder 321 holds four blue laser emitters in the first stage, six blue laser emitters in the second to fifth stages, and four blue laser emitters in in the sixth stage, as excitation light sources.

That is, in the element holder 321, excitation light sources as first light sources are disposed at 32 positions excluding both ends of the uppermost row and the lowermost row in a form of a matrix of six rows×six columns.

All laser light condensed by the condenser lens 315 enters the diffusion plate 317, and the coherency of the laser light is reduced by the diffusion plate 317.

The laser light transmitted through the diffusion plate 317 enters the phosphor wheel 333 or the like of the light source device 330.

The light source device 330 includes the phosphor wheel 333 rotated by a wheel motor 341 as the phosphor light emitting device 331, the red light source device 350, and the light guide optical system 370.

The phosphor wheel 333 is a disk-shaped member including a diffusion transmission region and a phosphor region. The diffusion transmission region includes a plate-shaped body transmitting and diffusing light on a circumference.

The red light source device 350 is a monochromatic light emitting device including a red light emitting diode and a condenser lens group 353. The red light emitting diode is a semiconductor light emitting element and disposed such that an optical axis of the excitation light from the excitation light irradiation device 310 is parallel to an optical axis of the red light emitting diode. The condenser lens group 353 condenses light emitted from the red light emitting diode.

The light guide optical system 370 includes dichroic mirrors and condenser lenses 379. That is, the light guide optical system 370 includes a first dichroic mirror 371 disposed between the diffusion plate 317 of the excitation light irradiation device 310 and the phosphor wheel 333, a second dichroic mirror 373 disposed in front of the first dichroic mirror 371 at the position of the optical axis of the light emitted from the red light source device 350, a reflecting mirror 377 disposed to the left of the phosphor wheel 333, a third dichroic mirror 375 disposed in front of the reflecting mirror 377 and to the left of the second dichroic mirror 373, and the condenser lenses 379 disposed between the dichroic mirrors and between the reflecting mirror 377 and the dichroic mirror.

The first dichroic mirror 371 transmits light in a blue wavelength band and reflects light in a green wavelength band.

Therefore, the excitation light from the excitation light irradiation device 310 is transmitted and can be irradiated on the phosphor wheel 333, and fluorescent light from the phosphor wheel 333 is reflected to the front of the projector 100.

The second dichroic mirror 373 transmits light in a red wavelength band and reflects the light in the green wavelength band.

Therefore, the light in the green wavelength band reflected by the first dichroic mirror 371 and passing through the condenser lenses 379 is reflected to the left of the projector 100, and the light in the red wavelength band emitted from the red light source device 350 is transmitted so as to make the optical axis of the reflected light in the green wavelength band match the optical axis of the light in the red wavelength band.

The reflecting mirror 377 reflects the light in the blue wavelength band which is excitation light from the excitation light irradiation device 310 and which is transmitted through the diffusion transmission region of the phosphor wheel 333, to the front of the projector 100.

The third dichroic mirror 375 transmits the light in the blue wavelength band and reflects the light in the green wavelength band and the light in the red wavelength band.

Therefore, the third dichroic mirror 375 transmits the light in the blue wavelength band from the reflecting mirror 377 and reflects the light in the red wavelength band which is transmitted through the second dichroic mirror 373 and the light in the green wavelength band which is reflected by the second dichroic mirror 373, so that axes of the light in the blue wavelength band, the light in the green wavelength band and the light in the red wavelength band coincide with one another and are emitted to the light source side optical device 380 which is disposed in front.

The light source side optical device 380 uniforms the light source light and guides the light source light to the display element 420, and includes condensing lenses 381, 385, a light tunnel 383, and an optical axis changing mirror 387.

The light source side optical device 380 causes the light source light passing through the third dichroic mirror 375 of the light source device 330 to be condensed by the condensing lens 381, causes the light source light enter the light tunnel 383, so that the light source light is uniformed.

Further, the uniformed light which is emitted from the light tunnel 383 is condensed by the condenser lens 385 and is irradiated to the optical axis changing mirror 387.

Then, the light reflected by the optical axis changing mirror 387 enters the display element 420.

The optical axis changing mirror 387 changes the optical axis of the light emitted from the light tunnel 383 by 90 degrees to the left.

Thus, the light source light whose traveling direction is changed by the optical axis changing mirror 387 proceeds in parallel to an incident surface of the display element 420, enters a TR prism 389 disposed nearest to the front of the display element 420, and is irradiated to an image forming surface of the display element 420.

The display element 420 includes a digital micro-mirror device called DMD and forms the image light.

The projection optical system unit 410 includes a projection lens unit 415, an aspherical mirror 417, a cover glass 419, or the like, and irradiates the image light formed by the display element 420 to the aspherical mirror 417 through the projection lens unit 415.

The image light reflected by the aspherical mirror 417 is emitted from the projection optical system unit 410 through the cover glass 419, transmitted through the projection port 125 of the upper case 110, and projected onto a screen or the like.

As shown in FIG. 7, the projection lens unit 415 includes a fixed cylinder 431 and a movable cylinder 432 (see FIG. 6) disposed on an outer peripheral side of the fixed cylinder 431 in a way of being rotatable about the optical axis and slidable on the optical axis, a fixed lens group (not shown) incorporated in the fixed cylinder 431, and the movable lens group 416 (see FIG. 4) incorporated in the movable cylinder 432. When the movable cylinder 432 is rotated, the movable lens group 416 advances and retracts in an optical axis direction, and the zoom adjustment, the focus adjustment, and fine focus adjustment are performed.

The zoom adjustment and the focus adjustment are performed based on the rotation operation of the movable cylinder 432 by the lens motor 239 (see FIG. 4), but the focus adjustment can also be performed by manually rotating the movable cylinder 432.

As shown in FIG. 6, a focus operating device 433 is connected to the movable cylinder 432, and the movable cylinder 432 is manually rotated through the focus operating device 433.

Focus Operating Device 433

Next, the focus operating device 433 will be described with reference to FIGS. 8, 9A, and 9B.

Figure 8:
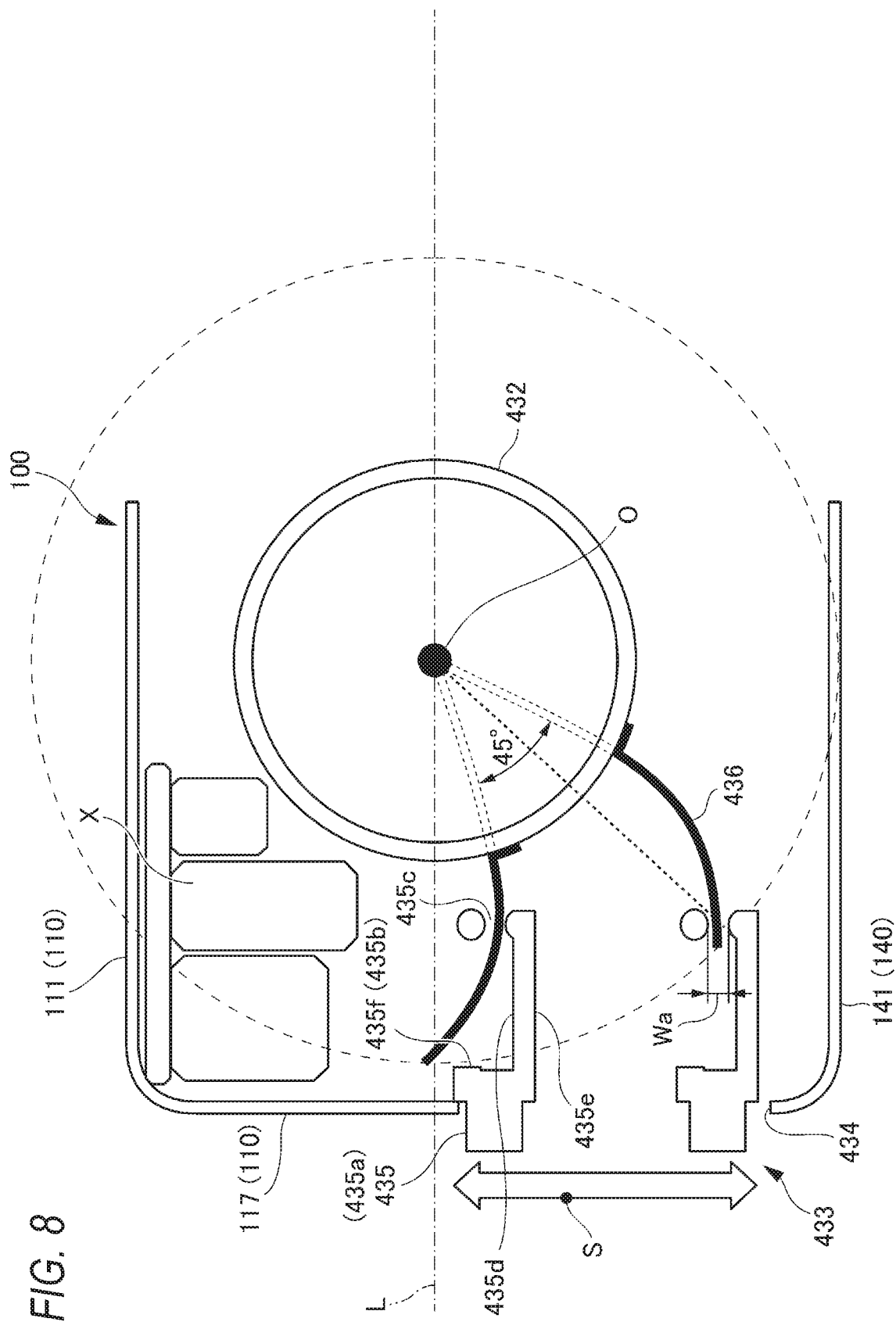
FIG. 8 is a diagram showing a focus operating device of the projector according to the embodiment of the present invention.

FIG. 8 is a diagram showing the focus operating device 433 of the projector 100 according to the embodiment of the present invention. FIG. 9A is an operation explanatory diagram showing the focus operating device 433 of the projector 100 according to the embodiment of the present invention. FIG. 9B is an operation explanatory diagram showing a focus operating device 1433 according to a modification.

Figure 9A:
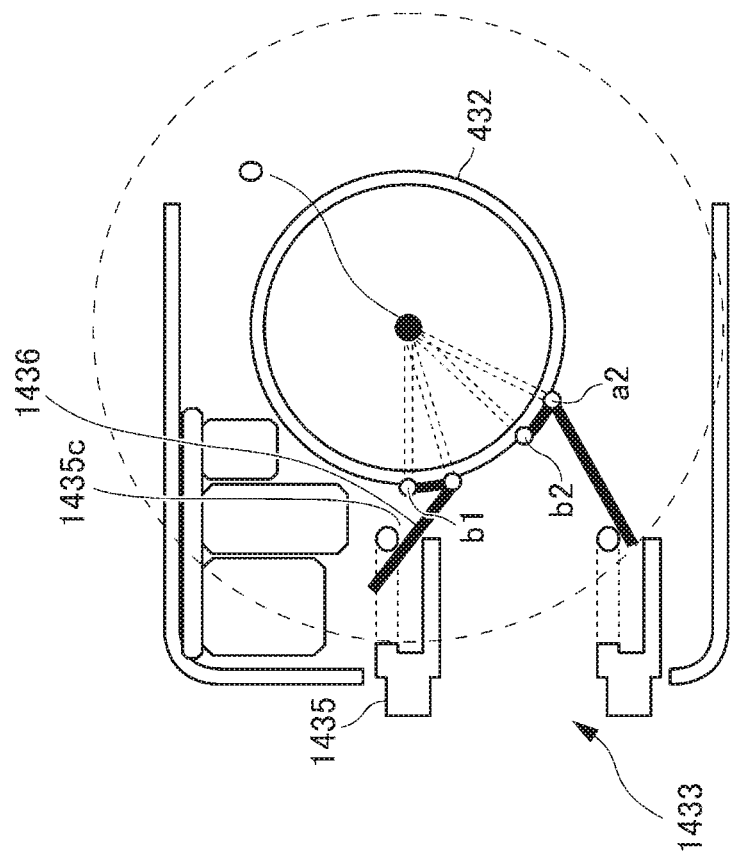
FIG. 9A is an operation explanatory diagram showing the focus operating device of the projector according to the embodiment of the present invention.
Figure 9B:
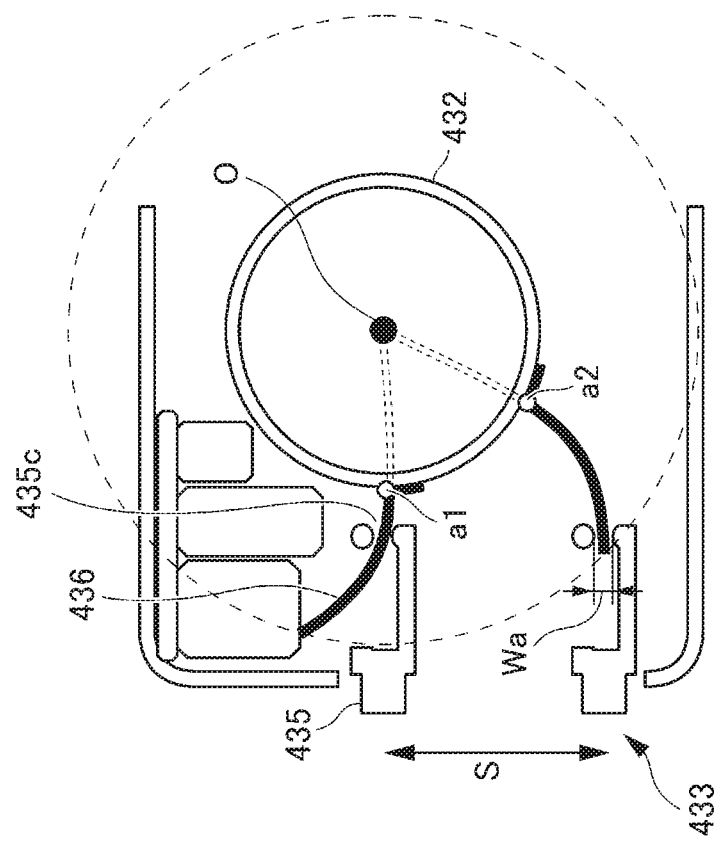
FIG. 9B is an operation explanatory diagram showing a focus operating device of a projector according to a modification.

FIGS. 8, 9A, and 9B are schematic diagrams where unnecessary members or the like are omitted in order to facilitate understanding of the operation of the focus operating device 433, and the case where a lever 435 is located at one end portion (an upper end portion in this example) and another end portion (a lower end portion in this example) of a movement range S is also shown.

The focus operating device 433 is an operating device rotating the movable cylinder 432, to which is a rotation body, by lever operation. The focus operating device 433 includes a lever guide portion 434 formed along the upper-lower direction on the left side plate 117 of the upper case 110, the lever 435 movable in the upper-lower direction along the lever guide portion 434, and an arm 436 slidably inserted into the lever 435 and transmitting the movement of the lever 435 as a rotational force to the movable cylinder 432.

The lever guide portion 434 includes a long hole supporting the lever 435, so that the lever 435 is not movable in the left-right direction and the front-rear direction and is movable in the upper-lower direction. A long hole direction of the lever guide portion 434, that is, a moving direction of the lever 435 is not limited to the upper-lower direction, and may be the left-right direction or the front-rear direction as long as the long hole direction is orthogonal to the rotation axis of the movable cylinder 432.

In the present embodiment, the movable cylinder 432 incorporates the movable lens group 416 (see FIG. 4), and the rotation axis of the movable cylinder 432 substantially coincides with the optical axis of the movable lens group 416.

The lever 435 includes an operating portion 435*a* moved by a user from the outside of the upper case 110 and a base portion having an internal space 435*b* which receives the arm 436. At a rear end which is a movable cylinder 432 side of a base portion of the lever 435, an insertion opening 435*c* receiving the arm 436 in the internal space 435*b* is formed.

A base end side of the arm 436 is integrally fixed to an outer peripheral surface of the movable cylinder 432, and a tip end side of the arm 436 is slidably inserted into the insertion opening 435*c* of the lever 435.

Incidentally, in FIG. 8 (schematic diagram), a state where the portion of the arm 436 extending from the outer peripheral surface of the movable cylinder 432 is extended to a rotation center O of the movable cylinder 432 is indicated by a dotted line, which is intended to facilitate understanding of a rotation angle of the movable cylinder 432 by the focus adjustment.

In the present embodiment, a fixing piece for bending the base end side of the arm 436 to integrally fix the arm 436 to the outer peripheral surface of the movable cylinder 432 is provided, and the arm 436 is attached to the outer peripheral surface of the movable cylinder 432 by, for example, welding or riveting the fixed piece. However, the present invention is not limited to this, and the arm 436 may be formed integrally with the outer peripheral surface of the movable cylinder 432.

In such a focus operating device 433, when the lever 435 is linearly moved in the movement range S in the upper-lower direction, the linear motion is transmitted as a rotational force to the movable cylinder 432 via the arm 436, and the focus adjustment is performed.

As shown in FIGS. 8, 9A and 9B, when a component X is disposed above the lever 435 by a request for downsizing the projector 100 or the like, there is a restriction that the movable range S of the lever 435 needs to be set on a lower side of the component X.

On the contrary, when the component X is disposed below the lever 435, there is a restriction that the movable range S of the lever 435 must be set on an upper side of the component X.

Therefore, it is difficult to ensure the necessary movement range S of the lever 435, which may make it difficult to ensure a necessary rotation angle of the movable cylinder 432.

For example, when the component X is on the upper side or the lower side, when a range of lever operating directions is divided into a first range and a second range based on a straight line (reference line) L passing through the rotation center O of the movable cylinder 432 and orthogonal to the lever operating direction (also referred to as a first direction), which is a direction orthogonal to the rotation center (rotation axis) O of the movable cylinder 432, the movement range S of the lever 435 can probably set within one of the first range and the second range. In this case, since it is possible to ensure only the movement range S of about half of a movement range MR described above with reference to FIG. 10, it is important to ensure a necessary rotation amount (rotation angle) of the movable cylinder 432 in a small movement range S.

Therefore, the arm 436 of the present embodiment has a curved shape on one side (an upper side in the present embodiment) in the lever operating direction from the movable cylinder 432 to the lever 435, so that a large rotation amount (rotation angle) of the movable cylinder 432 can be ensured in the small movement range S, which will be described in more detail below.

The lever 435 includes an upper surface 435*d* and a lower surface 435*e* which are facing to each other in the lever operating direction, and on the upper surface 435*d* on the curved side of the arm 436, the lever 435 of the present embodiment includes an opening 435*f* formed such that the tip end side of the arm 436 inserted into the internal space 435*b* can enter and exit the opening 435*f*. Accordingly, the lever 435 and the arm 436 do not interfere with each other when the lever 435 is operated.

A bending direction of the arm 436 in this example is upward, but the bending direction may be downward. In either case, the bending direction of the arm 436 is curved in the operating direction (the upper-lower direction in this example) of the lever 435, and the arm 436 is curved toward the opening 435*f* side provided on one surface among the upper surface 435*d* (a first surface) and the lower surface 435*e* (a second surface) which are facing to each other in the in the lever operating direction (the first direction).

Further, in the present embodiment, as shown in FIG. 8, when the lever 435 is located at an end portion of a movable range (in this example, the end portion on the upper side, the end portion of the arm 436 where the insertion amount of the arm 436 into the lever 435 is larger), the curved shape of the arm 436 is largely curved on the lever 435 side from a position where the arm 436 is located at the insertion opening 435*c*.

Figure 10:
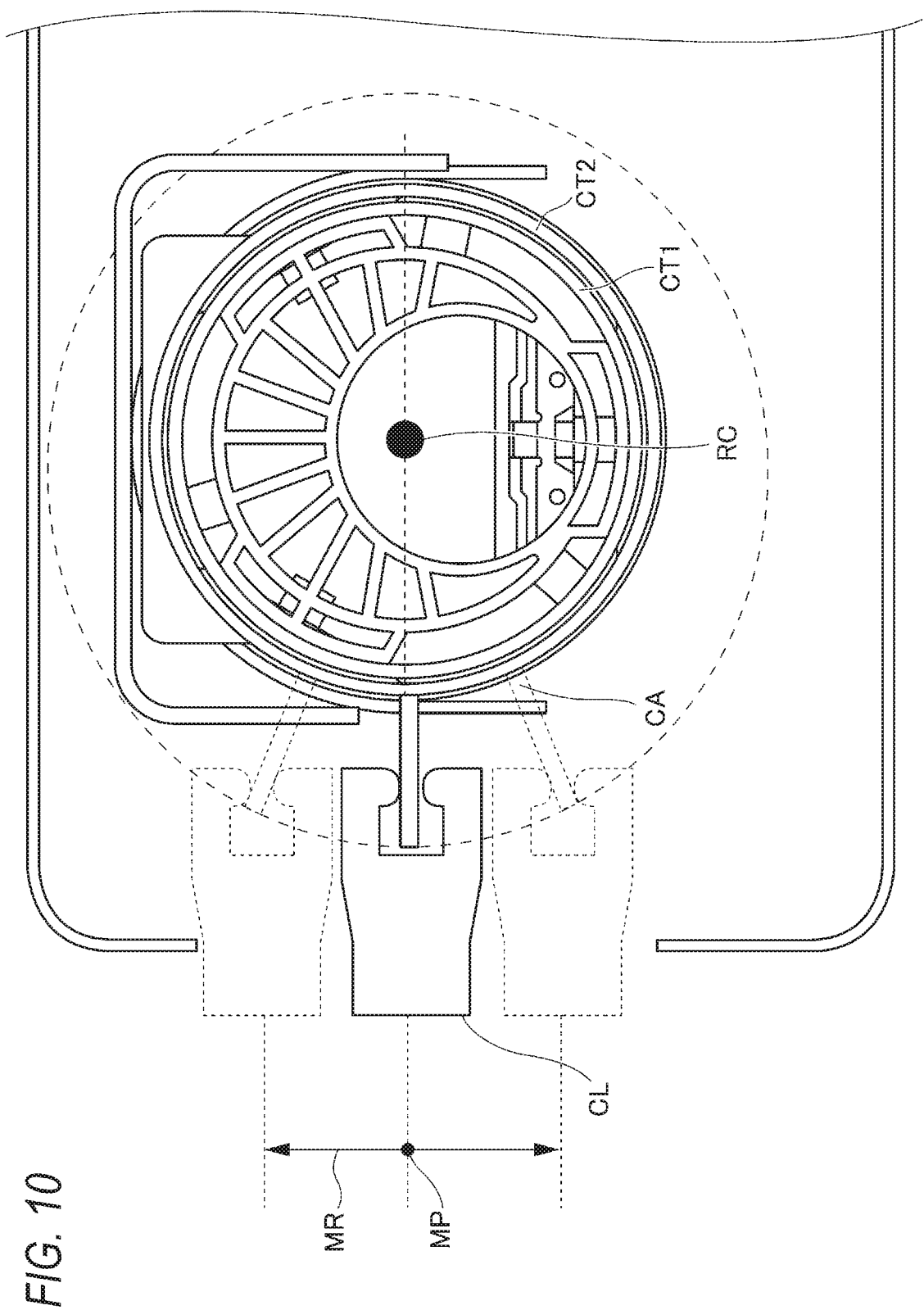
FIG. 10 is a diagram for explaining a focus operating device of a related projector.

According to the focus operating device 433 shown in FIG. 8, as shown in FIG. 10, it is possible to reduce the movement range S of the lever 435 necessary for rotating the movable cylinder 432 by the same angle as compared with a related focus operating device including a linear arm CA.

FIG. 9A shows the focus operating device 433 of the present embodiment including the curved arm 436, and FIG. 9B shows the focus operating device 1433 of a modification including a linear arm 1436.

More specifically, with respect to the related focus operating device including the linear arm CA, in the focus operating device 433 of the present embodiment including the curved arm 436 of FIG. 9A and the focus operating device 1433 of the modification including the linear arm 1436 of FIG. 9B, the arm has a shape extending from the movable cylinder 432 toward a lever 1435 when a position of the lever 1435 is at the farthest position within the movable range from the reference line passing through the rotation center of the movable cylinder 432 and orthogonal to the direction which is orthogonal to the rotation axis of the movable cylinder 432. In the focus operating device 1433 of FIG. 9B, the arm 1436 extends in a direction toward a reference line side instead of a direction orthogonal to a tangential line passing through a point a2 on the outer periphery of the movable cylinder 432, with the point a2 as a base point when the position of the lever 1435 is at the farthest position within the movable range from the reference line passing through the rotation center O of the movable cylinder 432 and orthogonal to the direction which is orthogonal to the rotation axis of the movable cylinder 432.

The radii of the movable cylinders 432 in FIGS. 9A and 9B from the rotation centers O are the same circle, and the circles along the tip trajectory of the arm 436 and the arm 1436 are indicated by dotted lines.

When the lever 435 is moved in the movement range S in the upper-lower direction, the movable cylinder 432 rotates by an angle between a point a1 and a point a2 as shown in FIG. 9A in a case where the arm 436 is curved.

Meanwhile, when the lever 1435 is moved in the movement range S in the upper-lower direction, the movable cylinder 432 rotates by an angle between a point b1 and a point b2 as shown in FIG. 9B in a case of a related linear arm CA of FIG. 10.

In a case of FIG. 9B, similar to the curved arm 436 of FIG. 9A, when the lever 1435 is moved in the same movement range S, it is possible to rotate the movable cylinder 432 at the same angle as the curved arm 436.

On the other hand, when the arm 436 is curved, since an insertion angle of the arm 436 with respect to the insertion opening 435c of the lever 435 does not greatly change even when the lever 435 is located in any of the movement range S, even if a width Wa of the insertion opening 435c of the lever 435 in the lever operating direction is reduced, the movement of the tip end side of the arm 436 is not hindered, and backlash between the lever 435 and the arm 436 can be suppressed.

For example, in the present embodiment, the width Wa of the insertion opening 435c of the lever 435 in the lever operating direction is set to be twice or less than the thickness of the arm 436 in the lever operating direction.

In FIG. 9B, the linear arm 1436 has a linear configuration, but is not limited thereto. The arm 1436 does not extend in the direction orthogonal to the tangential line passing through the point a2 on the outer periphery of the movable cylinder 432 with the point a2 as a base point, and may not extend in a direction toward the reference line side when the position of the lever 1435 is at the farthest position within the movable range from the reference line passing through the rotation center O of the movable cylinder 432 and orthogonal to the direction which is orthogonal to the rotation axis of the movable cylinder 432. Specifically, the arm 1436 may extend in the direction of the lever with a structure bent in a direction toward the reference line side at a position in the middle of the linear arm. Accordingly, the cross-section of the arm 1436 may be in a structure of two straight lines, or the straight arm 1436 may be bent stepwise, that is, the cross-section of the arm 1436 may be in a structure composed of three or more lines.

In the operating device of the above embodiment, the lever 435 includes the operating portion 435a formed on one end side, the base portion formed adjacent to the operating portion 435a, and the insertion opening 435c for inserting the arm 436 and formed adjacent to the base portion on another end side which is the movable cylinder (rotation body) 432 side, but the present invention is not limited to this structure. At least the arm may have a shape extending toward the reference line side when the position of the lever is at the farthest position within the range in which the lever is movable (the movable range) from the reference line orthogonal to the first direction and passing through the rotation center of the rotation body.

Therefore, any configuration of the arm 436 is adoptable as long as the arm is disposed between the lever 435 and the movable cylinder (rotation body) 432, slidable on the lever 435, and can transmit the linear motion of the lever 435 as the rotational force to the movable cylinder (rotation body) 432. Therefore, the arm 436 may not be slidably inserted into the insertion opening 435c of the lever 435.

For example, although not shown, the lever may include the operating portion formed on one end side, the base portion formed adjacent to the operating portion, and a protruding portion provided on a side surface of the base portion (a surface parallel to a circular surface of the cylindrical rotation body 432), and a long hole may be formed from one end side to the other end side of the side surface (the surface parallel to the circular surface of the cylindrical rotation body 432) of the arm corresponding to this lever. With this configuration, the protruding portion provided on a side surface of the lever is always disposed in the long hole formed in the side surface of the arm, and the protruding portion of the lever moves within the long hole of the arm through the linear motion of the lever caused by operating the operating portion of the lever by a user.

The present invention is not limited to the specific embodiment, and various modifications and improvements are included in the technical scope of the present invention, which will be apparent to those skilled in the art from the scope of the claims.

For example, in the above embodiment, the case where the operating device for rotating the rotation body according to the present invention by the lever operation is used for the projection optical system unit 410 of the projector 100 as the projection apparatus has been described, but as described above, there is a similar problem in the case of a projection apparatus including the operating device which transmits linear motion of the lever as the rotational force to the rotation body by the arm slidably inserted into the lever.

Therefore, the operating device for rotating the rotation body according to the present invention by the lever operation is not limited to being applied to the projector 100, and the operating device can be used by a device as long as the device requires the operating device which transmits the linear motion of the lever as the rotational force to the rotation body by the arm slidably inserted into the lever.

What is claimed is:

1. An operating device which rotates a cylindrical rotation body by lever operation to adjust a rotation angle, the operating device comprising:
   a lever that is linearly movable along a direction orthogonal to a rotation axis of the rotation body;
   the rotation body that is rotated by lever operation; and
   an arm that is fixed to the rotation body and transmits a movement of the lever as a rotational force to the rotation body,
   wherein the arm has a shape extending from the rotation body toward the lever in a state where a position of the lever is at the farthest position within a movable range from a reference line passing through a rotation center of the rotation body and orthogonal to a direction which is orthogonal to the rotation axis of the rotation body, and
   wherein the lever includes:
      an insertion opening which allows the arm to insert to the insertion opening; and an opening formed on a surface facing in an operating direction such that a tip end side of the arm inserted into an internal space of the lever can enter and exit the opening in accordance with the movement of the lever.

2. The operating device according to claim 1,
wherein the lever includes;
an operating portion which is formed on one end side; and
a base portion which is formed adjacent to the operating portion, and
the insertion opening is formed adjacent to the base portion on another end side which is a rotation body side.

3. The operating device according to claim 2,
wherein a width of the insertion opening in a moving direction of the lever is twice or less than a thickness of the arm in the moving direction of the lever.

4. The operating device according to claim 1,
wherein the arm has a curved shape bending from the rotation body toward the lever in a state where the position of the lever is at the farthest position within the movable range from the reference line passing through the rotation center of the rotation body and orthogonal to the direction which is orthogonal to the rotation axis of the rotation body.

5. The operating device according to claim 2,
wherein the arm has a curved shape bending from the rotation body toward the lever in a state where the position of the lever is at the farthest position within the movable range from the reference line passing through the rotation center of the rotation body and orthogonal to the direction which is orthogonal to the rotation axis of the rotation body.

6. The operating device according to claim 3,
wherein the arm has a curved shape bending from the rotation body toward the lever in a state where the position of the lever is at the farthest position within the movable range from the reference line passing through the rotation center of the rotation body and orthogonal to the direction which is orthogonal to the rotation axis of the rotation body.

7. The operating device according to claim 1,
wherein when a range of a moving direction of the lever is divided into a first range and a second range based on the reference line, the movable range of the lever is biased to one of the first range and the second range.

8. The operating device according to claim 2,
wherein when a range of a moving direction of the lever is divided into a first range and a second range based on the reference line, the movable range of the lever is biased to one of the first range and the second range.

9. The operating device according to claim 3,
wherein when a range of the moving direction of the lever is divided into a first range and a second range based on the reference line, the movable range of the lever is biased to one of the first range and the second range.

10. The operating device according to claim 4,
wherein when a range of a moving direction of the lever is divided into a first range and a second range based on the reference line, the movable range of the lever is biased to one of the first range and the second range.

11. The operating device according to claim 5,
wherein when a range of a moving direction of the lever is divided into a first range and a second range based on the reference line, the movable range of the lever is biased to one of the first range and the second range.

12. The operating device according to claim 6,
wherein when a range of the moving direction of the lever is divided into a first range and a second range based on the reference line, the movable range of the lever is biased to one of the first range and the second range.

13. A projection apparatus comprising:
the operating device according to claim 1;
a case;
a light source device that is disposed in the case;
a display element that is disposed in the case and irradiated with light emitted from the light source device to form image light;
a projection optical system that is disposed in the case and projects the image light formed by the display element onto a screen; and
a control unit that is disposed in the case and controls the display element and the light source device,
wherein a lever guide portion is formed in the case along a first direction, and the lever is movable in the first direction along the lever guide portion, and
wherein the operating device is disposed in the projection optical system.

14. A projection apparatus comprising:
the operating device according to claim 2;
a case;
a light source device that is disposed in the case;
a display element that is disposed in the case and irradiated with light emitted from the light source device to form image light;
a projection optical system that is disposed in the case and projects the image light formed by the display element onto a screen; and
a control unit that is disposed in the case and controls the display element and the light source device,
wherein a lever guide portion is formed in the case along a first direction, and the lever is movable in the first direction along the lever guide portion, and
wherein the operating device is disposed in the projection optical system.

15. A projection apparatus comprising:
the operating device according to claim 3;
a case;
a light source device that is disposed in the case;
a display element that is disposed in the case and irradiated with light emitted from the light source device to form image light;
a projection optical system that is disposed in the case and projects the image light formed by the display element onto a screen; and
a control unit that is disposed in the case and controls the display element and the light source device,
wherein a lever guide portion is formed in the case along a first direction, and the lever is movable in the first direction along the lever guide portion, and
wherein the operating device is disposed in the projection optical system.

16. A projection apparatus comprising:
the operating device according to claim 4;
a case;
a light source device that is disposed in the case;
a display element that is disposed in the case and irradiated with light emitted from the light source device to form image light;
a projection optical system that is disposed in the case and projects the image light formed by the display element onto a screen; and a control unit that is disposed in the case and controls the display element and the light source device, wherein a lever guide portion is formed in the case along a first direction, and the lever is movable in the first direction along the lever guide portion, and wherein the operating device is disposed in the projection optical system.

17. A projection apparatus comprising:

the operating device according to claim 5;

a case;

a light source device that is disposed in the case;

a display element that is disposed in the case and irradiated with light emitted from the light source device to form image light;

a projection optical system that is disposed in the case and projects the image light formed by the display element onto a screen; and a control unit that is disposed in the case and controls the display element and the light source device, wherein a lever guide portion is formed in the case along a first direction, and the lever is movable in the first direction along the lever guide portion, and wherein the operating device is disposed in the projection optical system.

18. A projection apparatus comprising:

the operating device according to claim 6;

a case;

a light source device that is disposed in the case;

a display element that is disposed in the case and irradiated with light emitted from the light source device to form image light;

a projection optical system that is disposed in the case and projects the image light formed by the display element onto a screen; and a control unit that is disposed in the case and controls the display element and the light source device, wherein a lever guide portion is formed in the case along a first direction, and the lever is movable in the first direction along the lever guide portion, and wherein the operating device is disposed in the projection optical system.

19. A projection apparatus comprising:

the operating device according to claim 7;

a case;

a light source device that is disposed in the case;

a display element that is disposed in the case and irradiated with light emitted from the light source device to form image light;

a projection optical system that is disposed in the case and projects the image light formed by the display element onto a screen; and a control unit that is disposed in the case and controls the display element and the light source device, wherein a lever guide portion is formed in the case along a first direction, and the lever is movable in the first direction along the lever guide portion, and wherein the operating device is disposed in the projection optical system.

20. A projection apparatus comprising:

the operating device according to claim 8;

a case;

a light source device that is disposed in the case;

a display element that is disposed in the case and irradiated with light emitted from the light source device to form image light;

a projection optical system that is disposed in the case and projects the image light formed by the display element onto a screen; and a control unit that is disposed in the case and controls the display element and the light source device, wherein a lever guide portion is formed in the case along a first direction, and the lever is movable in the first direction along the lever guide portion, and wherein the operating device is disposed in the projection optical system.

* * * * *